US007988440B2

(12) United States Patent
Schmidt et al.

(10) Patent No.: US 7,988,440 B2
(45) Date of Patent: Aug. 2, 2011

(54) APPARATUS FOR THE MEASUREMENT OF THE VERTICAL POSITION OF UPPER AND LOWER PUNCHES OF A ROTARY TABLET PRESS

(75) Inventors: Ingo Schmidt, Schwarzenbek (DE); Keno Freyer, Lüneburg (DE); Werner Seifert, Wentorf (DE); Wolfram Lämmerhirt, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 6 days.

(21) Appl. No.: 12/408,310

(22) Filed: Mar. 20, 2009

(65) Prior Publication Data

US 2009/0243132 A1 Oct. 1, 2009

(30) Foreign Application Priority Data

Mar. 27, 2008 (DE) ........................ 10 2008 015 820

(51) Int. Cl.

*B28B 17/00* (2006.01)
*A01J 21/00* (2006.01)
*A01J 25/12* (2006.01)
*G01D 5/347* (2006.01)
*G01B 3/00* (2006.01)

(52) U.S. Cl. .................... 425/150; 425/348 R; 425/353; 33/706; 73/1.79

(58) Field of Classification Search ........................ None
See application file for complete search history.

(56) References Cited

U.S. PATENT DOCUMENTS

| | | | | |
|---|---|---|---|---|
| 4,030,868 | A * | 6/1977 | Williams | 425/149 |
| 5,211,964 | A * | 5/1993 | Prytherch et al. | 425/140 |
| 5,517,871 | A * | 5/1996 | Pento | 73/865.9 |
| 5,699,273 | A * | 12/1997 | Hinzpeter et al. | 702/105 |
| 5,760,392 | A * | 6/1998 | Hisamoto et al. | 250/237 G |
| 5,838,571 | A * | 11/1998 | Lewis | 700/206 |
| 6,442,859 | B1 * | 9/2002 | Hinzpeter et al. | 33/645 |
| 2005/0200038 | A1 * | 9/2005 | Vogeleer et al. | 264/40.1 |

FOREIGN PATENT DOCUMENTS

| | | | |
|---|---|---|---|
| DE | 195 02 596 | A1 | 8/1998 |
| DE | 20 2005 011 876 | U1 | 11/2005 |
| DE | 10 2005 051 567 | A1 | 4/2007 |
| DE | 20 2007 015 275 | U1 | 12/2008 |
| GB | 2 276 476 | A | 3/1993 |

* cited by examiner

*Primary Examiner* — Christina Johnson
*Assistant Examiner* — Benjamin Schiffman
(74) *Attorney, Agent, or Firm* — Vidas, Arrett & Steinkraus

(57) ABSTRACT

The present invention is related to an apparatus and a method for the measurement of the vertical position of upper and lower punches, pairwisely associated to a rotatably driven rotor of a rotary tablet press and rotating synchronously with the rotor, which perform a vertical movement in certain regions along the circumference of their rotational movement during a rotation of the rotor. The apparatus features at least one scale arranged on at least one of the upper and/or lower punches, running in parallel to the vertical movement direction of the respective upper and/or lower punch, and at least one reading device associated to the scale, also rotating synchronously with the rotor, by means of which a vertical position of the respective upper and/or lower punch can be measured by reading out the scale. The inventions is furthermore related to a corresponding rotary tablet press and a corresponding method.

9 Claims, 4 Drawing Sheets

APPARATUS FOR THE MEASUREMENT OF THE VERTICAL POSITION OF UPPER AND LOWER PUNCHES OF A ROTARY TABLET PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an apparatus and a method for the measurement of the vertical position of upper and lower punches, pairwisely associated to a rotatably driven rotor of a rotary tablet press and rotating synchronously with the rotor, which perform a vertical movement in certain regions along the circumference of their rotational movement during a rotation of the rotor. Rotary tablet presses are known since a long time. The rotor of such presses has usually a die plate with a plurality of dies spaced apart over its circumference. In this, the rotor is equipped with a number of upper and lower punches forming compression punches of the press, wherein one lower punch and one upper punch is associated to each die. During one rotation of the rotor, each punch is subjected to a vertical movement at certain positions of the circumference, at the compression stations of the press in particular, which leads to a corresponding action of force to a material to be compressed which is filled into the dies. Besides to a precompression station and a main compression station, an ejection station must also be taken into consideration. The vertical movement of the compression punches is usually guided by cam curves. By for instance stationary pressing rollers, a pressing force is applied to the heads of the compression punches in the compression stations, and through this to the material which is to be compressed. Depending on the composition of the tablets to be pressed, a preset pressing force has to be maintained in this process.

Pressing force measurement devices are used in rotary tablet presses since many years for monitoring and controlling the compression process, in order to ensure the desired tablet quality. However, in the field of pharmaceutical laboratory and development work, it is not always sufficient to judge the compression process via the measurement of the pressing force. Other measurement variables have therefore to be used. The force-path diagram has an eminent importance for the determination of the compressions characteristics of pressed materials. Seen from the physical point of view, it describes the energy expenditure during the compression phase. From this, conclusions regarding the pressability and characteristics of the substances to be compressed can be drawn.

Different devices for the measurement and the detection of the punch path have become known. For instance, in DE 19502596 C2, the entire contents is incorporated herein by reference, it is proposed to calculate the punch path theoretically, based on the geometrical conditions of the press. A metrological approach is described in DE 102005051567 A1, the entire contents is incorporated herein by reference. In this, the distance to a marker in the form of a horizontal plate fixed on the punch is measured during the compression phase with a preferably stationarily arranged and contactless working sensor. Via the distance measurement, the compression phase of the punches can be monitored, i.e. the vertical movement in the compression stations. However, desired or undesired movements of the compression punches can occur beyond the compression phase, the measurement of which may also be required.

Devices in which inductive or ohmic path sensors are mounted before or behind the punch which is to be measured have also become known. However, these devices are sumptuous in the practical use.

BRIEF SUMMARY OF THE INVENTION

Starting from the explained state of the art, the present invention is based on the objective to provide an apparatus and a method of the kind mentioned in the beginning, by which a reliable and accurate measurement of the vertical position of the compression punches is possible at every circumferential position of the punches in a simple way.

For an apparatus of the kind mentioned in the beginning, the objective is resolved by at least one scale arranged on at least one of the upper and/or lower punches, running in parallel to the vertical movement direction of the respective upper and/or lower punch, and by at least one reading device associated to the scale, also rotating synchronously with the rotor, through which a vertical position of the respective upper and/or lower punch can be measured by reading out the scale.

For a method of the kind mentioned in the beginning, the objective is resolved in that vertical positions of at least one upper and/or lower punch are measured along the complete circumference of its rotational movement during at least one rotation of the rotor.

Thus, according to the present invention, a scale is provided on at least one, preferably several and more preferably on all the upper and/or lower punches, a linear scale in particular, for the measurement of lengths in the manner of a scale or a ruler. The reading device, rotating together with the rotor and the punches, can read out the scale and measure the vertical position of the respective compression punch in this way. In this, the vertical position of at least one upper and/or lower punch can be measured along the complete circumference of the rotational movement of the rotor with the apparatus of the present invention, by reading out the scale by means of the reading device during at least one rotation of the rotor. According to the present invention, an accurate and reliable measurement of the vertical position or the movement, respectively, of the punches is possible in a simple way. In this, the scale permits an absolute measurement of the vertical position or movement, respectively. In the method of the present invention, the measurement can take place at regular distances along the perimeter of the rotational movement of the punches. Decisive is only that measurement data are captured along the complete perimeter and not for instance only in the compression phase in the compression stations of the press, like this is provided in the state of the art (DE 10 2005 051 567 A1). In this way, vertical punch paths can be measured also in the curves of pull-up or pull-down or in the filling region of the press, in which the material to be compressed is filled into the dies. Thus, not predictable vertical punch movements can be captured and analysed also.

The reading device of the present invention comprises a sensor for reading out the scale. At least one analysing unit for the determination of the vertical position from the read-out scale data can be associated to the reading device(s). In particular, all the compression punches can have a scale, so that their vertical position can be determined. For this purpose, a corresponding number of reading devices, associated to the respective scales, can be provided. An own analysing unit can be associated to each reading device. However, one common analysing unit for plural or all the reading devices can be provided also.

The apparatus of the present invention is particularly suited for performing the method of the present invention. For instance, the method of the present invention can be performed with an apparatus of the present invention wherein the vertical positions of the at least one upper and lower punch are measured by reading out the scale by means of the reading device.

The problem on which the present invention is based is also resolved by a rotary tablet press with a rotatably driven rotor and upper and lower compression punches, pairwisely associated to the rotor and rotating synchronously with the rotor, which perform a vertical movement in certain regions along the circumference of its rotational movement during a rotation of the rotor, wherein the rotary tablet press features an apparatus of the present invention. In this, the rotor can have a die plate with a plurality of dies in a per se known manner, to which dies a plurality of upper and lower punches are associated always in pairs. During a rotation of the rotor, each of the punches is subjected to a vertical movement at certain positions of the circumference, and through this it causes an action of force to a material to be compressed which is filled into the dies. The guiding of the punches can take place by cam curves in an also per se known manner. Besides to a precompression station and a main compression station, an ejection station must also be taken into consideration in particular, on all of which stations a vertical movement of the punches takes place. By for instance stationary pressing rollers, the pressing force for the compression of the tablet material can be applied to the heads of the compression punches.

The scale may be an incremental scale, i.e. a scale with lines, which represents a length through the distance of division markers. However, the scale may also be an absolute scale, an absolutely encoded scale in particular, which features numerical values for instance, on which the vertical position of the respective punches can be read out absolutely. The reading device can be adapted to read out the scale optically, magnetically, capacitively and/or inductively. Correspondingly, the scale can be readable in an optical, magnetic, capacitive and/or inductive manner. The reading device can have an optical, magnetic, capacitive and/or inductive sensor for this purpose.

In a constructionally particularly simple way, the scale can be arranged on a circumferential surface of the respective upper and/or lower punch, being incorporated into the circumferential surface in particular. Also in a constructionally particularly simple way, the reading device can be arranged on an accommodation element of the respective upper and/or lower punch. In this, the scale may be arranged on or in the punch, such that its readable section points outwardly in the circumferential direction. The reading device can be fixed on the punch accommodation in a small distance to the scale. In particular, it can be arranged such that the scale integrated into the punch moves also vertically along the reading device and in particular along the measurement window of the reading device, when the rotor rotates and the respective punch moves vertically.

According to a further embodiment, particularly suited for practice, a sending device also synchronously rotating with the rotor and a receiving device arranged stationarily outside of the rotor are provided, wherein position data measured by the reading device can be sent to the receiving device by means of the sending device via wireless transmission. By means of such a wireless data transmission, data from the rotating device can be transmitted to a stationarily arranged receiving device in a particularly simple and reliable way. In this, the reading device can read out the incremental impulses or the absolutely encoded position of the respective punch at every point in time, and supply this information to the sending device installed on the rotor. The wireless data transmission between the sending device and the receiving device can take place via radio for instance. Subsequently, the data received by the receiving device can be guided to a control and/or operation device for further processing, which is for instance also arranged stationarily outside the rotor. The processing of the read-out data into position data can take place in the reading device or in the sending device or in the receiving device or in the control and/or operation device. The reading and the sending devices may also form one combined device. Then, a wireless sending of the position data to the external receiving device can take place in a direct manner. The external receiving device and the control device or the operation device, respectively, can deduce the condition and the operation of the plant from the received position data, and if necessary they can cause counter-measures, like a stop of the plant.

According to a particularly preferred embodiment, the apparatus can have an angular sensor, by which the circumferential positions of at least one upper and/or lower punch occupied during one rotation of the rotor can be measured, wherein the vertical positions of the at least one upper and/or lower punch measured by the reading device can be assigned, by means of an analysing device, to the circumferential positions of the respective upper and/or lower punch measured by the angular sensor. The angular sensor may be a so-called angle encoder for instance. Then, an incremental or absolute measurement of the rotational movement of the punches, of the angular positions in particular, along the circumference of their rotational movement is possible. Subsequently, there is an assignment of the measured vertical positions to the circumferential positions by the analysing device. Through this, a complete course of the movement in the vertical and in the rotational direction can be determined for the complete circumference of the rotational movement of the punches. Based on this, an evaluation whether the measured vertical movement takes place in the desired regions of the perimeter is then possible. If need be, counter-measures can be initiated. In particular, in doing so, the circumferential positions of all the punches can be measured and assigned to the respective vertical positions. The analysing device performs the assignment between vertical and circumferential movements. The analysing device may be the same device which also performs the determination of the vertical position data from the data measured by the reading device. Such an analysing device can be integrated into the reading device. But it can also be arranged separately, and for instance it may also rotate synchronously with the rotor or be integrated into other devices of the apparatus, for instance into an angular sensor or a sending device. In particular, it can be arranged stationarily outside of the rotor, for instance being integrated into a receiving device or a device for control or operation, respectively.

BRIEF DESCRIPTION OF THE DRAWINGS

An example of the realisation of the present invention is explained in more detail by means of a drawing in the following. Schematically show.

DETAILED DESCRIPTION OF THE INVENTION

Figure 1:
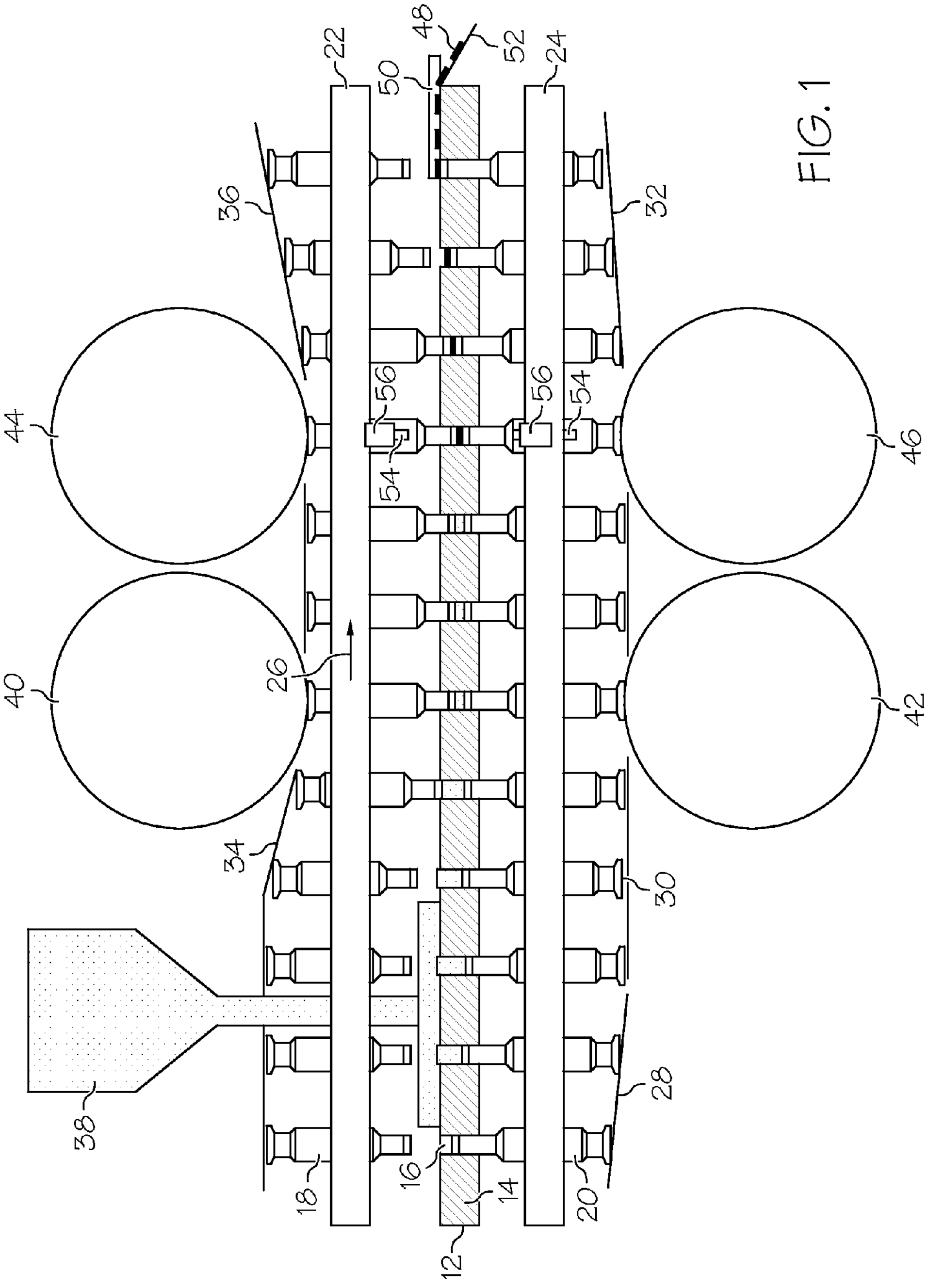
FIG. 1 a cut-out of a rotary tablet press of the present invention with an apparatus of the present invention, in an uncoiling, FIG. 2 a compression punch of the present invention in a lateral view, FIG. 3 the compression punch of FIG. 2 in a cross section, FIG. 4 a partial cross section of a rotor of a rotary tablet press with an apparatus of the present invention, and FIG. 5 a block diagram for the illustration of the method of the present invention.

While this invention may be embodied in many different forms, there are described in detail herein a specific preferred embodiment of the invention. This description is an exemplification of the principles of the invention and is not intended to limit the invention to the particular embodiment illustrated In the figures, same reference sign designate same objects. A rotary tablet press is shown in FIG. 1. Such tablets are per se known to those skilled in the art. The press has a rotor 12, rotatingly driven by means of a drive device not shown in more detail, an electric motor for instance. The rotor 12 has a die plate 14 with a plurality of die holes 16. To each die 16, one upper punch 18 and one lower punch 20 are associated as a pair. The upper and lower punches 18, 20 are each held on an upper punch accommodation 22 and a lower punch accommodation 24 and rotate in a rotation of the rotor 12 synchronously with the same, as is shown for the upper punch accommodation 22 by the arrow 26 illustrating the rotational direction. The upper and lower punches 18, 20 are also guided in per se known cam curves. A filling cam 28, a metering cam 30 and an ejection cam 32 for the lower punches 20 is shown by way of example in FIG. 1. A pull-down cam 34 and a pull-up cam 36 is shown by way of example for the upper punches. Tablet material to be compressed in powder form is filled into the dies 16 of the die plate 14 with a filling device 38. The powder-shaped material is pre-compressed in the dies 16 by means of an upper pre-pressing roller 40 and a lower pre-pressing roller 42 of a pre-compression station. Subsequently, the definitive compression in the main compression station takes place by upper and lower main pressing rollers 44, 46 in a per se known manner. Of course, plural such compression and filling stations can be provided, for instance in order to make multilayer tablets. The compressed tablets 48 are subsequently conveyed to the surface of the die plate 14 by means of the ejection cam 32, and guided into an outlet channel 52 in a strip-off device 50 for further usage.

Figure 3:
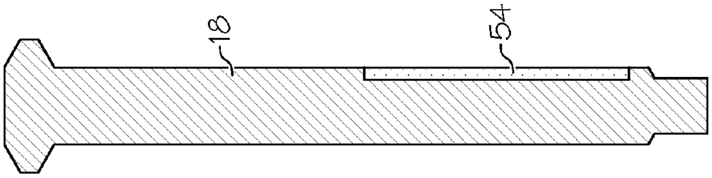
Figure 2:
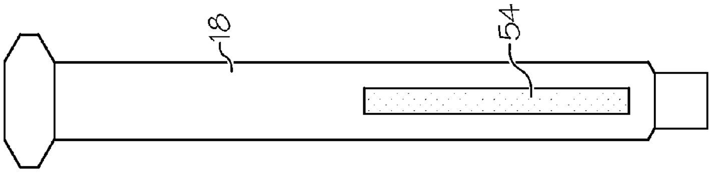

An apparatus of the present invention for the measurement of the vertical position of an upper punch 18 and a lower punch 20 is depicted in FIG. 1 by way of example on a pair of punches. In particular, a scale 54, a length scale in particular, running in parallel to the vertical movement direction of the respective upper and lower punch 18, 20, is arranged on each of an upper punch 18 and a lower punch 20. The length scales 54 are incorporated into the perimeter surface of the respective upper punches 18 and lower punches 20 in this. This is depicted in a magnified view by way of example for the upper punch 18 in the depictions in FIG. 2 and FIG. 3. For instance, the scales 54 may be incremental scales or absolutely encoded scales. Furthermore, two reading devices 56 associated to each of the scales 54 are provided. The reading devices 56, magnetic reading devices in the depicted example, are arranged on the upper punch accommodation 22 and on the lower punch accommodation 24, respectively, and thus they rotate also synchronously with the rotor 12. The scales 54 and the respective associated reading devices 56 do not move horizontally with respect to each other.

Figure 4:
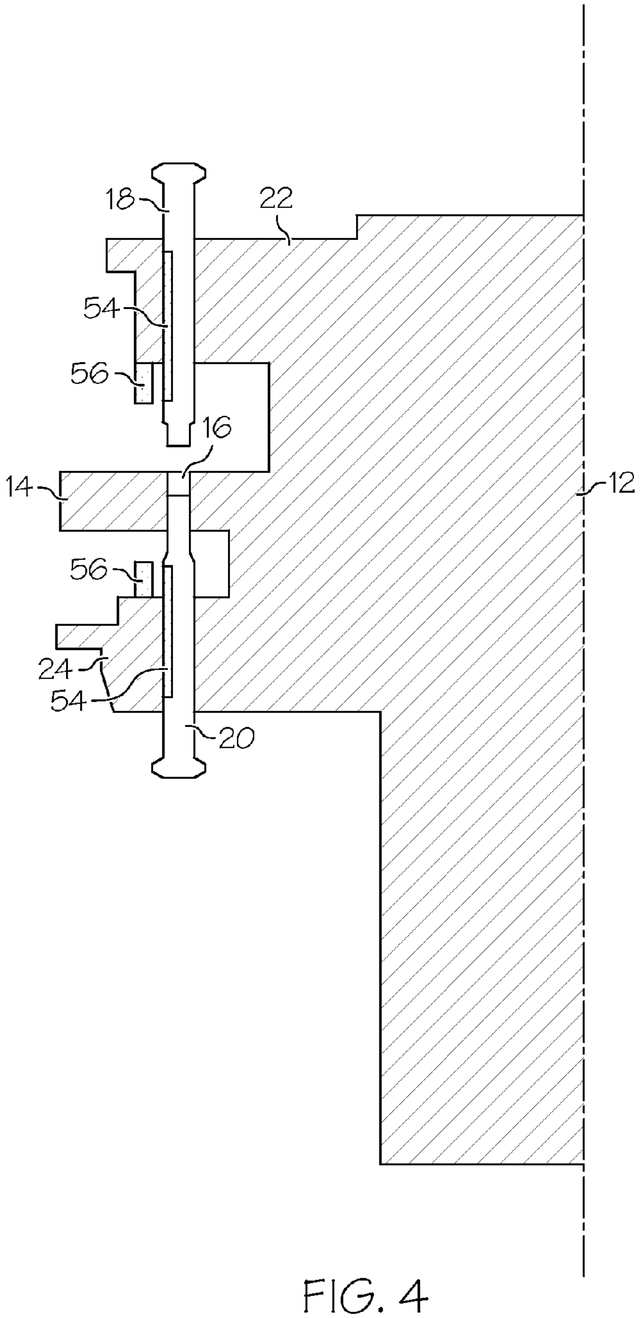

The arrangement of the reading devices 56 with respect to the scales 54 is shown in an enlarged view in FIG. 4. In this, the reading devices 56 are fixed on the respective punch accommodation 22, 24 in a small distance to the scales 54. In this, the scales 54 are incorporated into the circumferential surface of the punches 18, 20 such that they point outwardly in the circumferential direction of the rotational movement of the punches 18, 20. When the rotor 12 rotates and the punches 18, 20 as well as the reading devices 56 rotate together with it, the scales 54 integrated into the punches 18, 20 move in the vertical direction along the measurement window of the reading devices 56. In doing so, the reading devices 56 read out the incremental impulses or the absolutely encoded positions of the punches 18, 20 at every point in time of the rotational movement. From this, an analysing device integrated into each of the reading devices 56 determines the vertical positions or movements, respectively, of the punches 18, 20 along the complete circumference of their rotational movements. Of course, the analysing devices can also be provided separately from the reading devices 56. In particular, one common analysing device for several reading devices, all of them in particular, is possible. Furthermore is provided an angle encoder not shown in more detail, by which the circumferential positions of the punches 18, 20 occupied during a rotation of the rotor can be measured. By means of the analysing devices, the vertical positions of the punches 18, 20 measured with the reading devices 56 can be assigned to the circumferential positions of the punches 18, 20 measured with the angle encoder. Thus, a complete monitoring of the punch movements is possible in the vertical as well as in the rotational direction.

Figure 5:
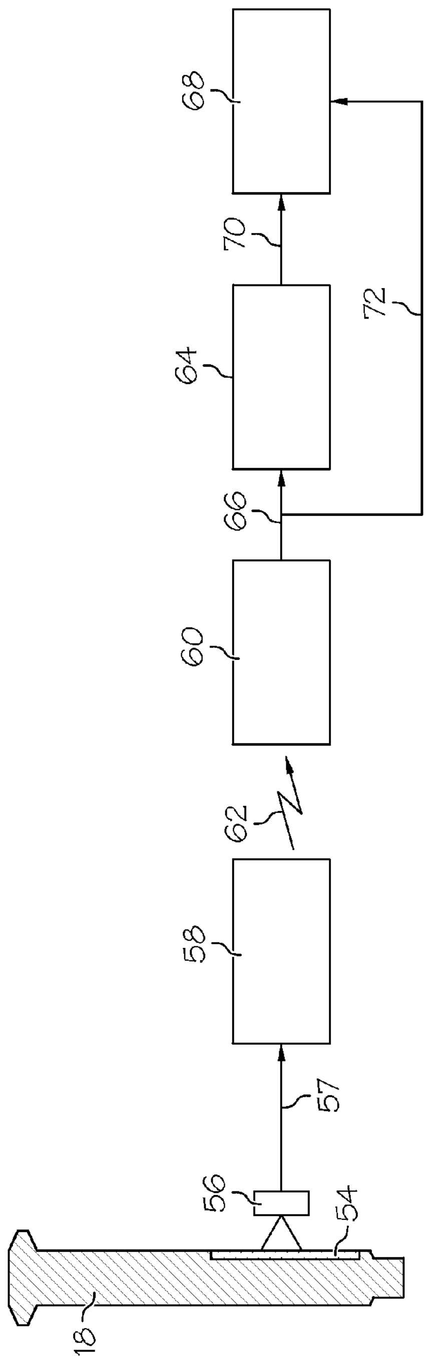

As shown in FIG. 5 by way of example for the upper punch 18, the position data determined by the reading device 56 are subsequently transmitted to a sending device 58, also arranged on the rotor and rotating with the rotor, as is illustrated by the arrow 57. From the sending device 58, the measured position data are sent in a wireless way, via radio for instance, to receiving device 60 arranged stationarily outside of the rotor 12, as is illustrated by the arrow 62. From the receiving device 60, the position data can be sent to a control device 64, also arranged stationarily outside of the rotor 12, as is illustrated by the arrow 66. From the control device 64, the data, if need be supplemented by corresponding control commands for controlling the tablet press, can be sent to an operation device 68, as is illustrated by the arrow 70. In particular, influence can be exerted by the control device 64 by means of suitable control commands in the case that the determined position data deviate from desired position data, so that the desired tablet quality is always reliably ensured. Corresponding advices for an operator can be output or corresponding inputs of the operator can be received, respectively, on the operation device 68. It is also possible that the position data received by the receiving device 60 are directly sent to the operation device 68 without running through the control device, as is illustrated in FIG. 5 by the arrow 72. In this case, the operator of the plant can manually compare the determined position data with desired data and initiate corresponding counter-measures, also manually for instance.

Of course, plural compression punches of the press, all of them in particular, can have an apparatus of the present invention with corresponding associated reading devices.

With the apparatus of the present invention and with the method of the present invention, respectively, even not predictable vertical punch movements can be captured and analysed in a constructionally simple and reliable manner. In turn, precise conclusions regarding the compressibility and the properties of the respective substances to be compressed can be drawn from this.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An apparatus for the measurement of the vertical position of upper and lower punches, pairwisely associated to a rotatably driven rotor of a rotary tablet press and rotating synchronously with the rotor, which perform a vertical movement in certain regions along the circumference of their rotational movement during a rotation of the rotor, characterised by at least one scale (54) arranged on at least one of the upper and/or lower punches (18, 20), running in parallel to the vertical movement direction of the respective upper and/or lower punch (18, 20), and at least one reading device (56) associated to the scale (54), also rotating synchronously with the rotor (12), by means of which a vertical position of the respective upper and/or lower punch (18, 20) can be measured by reading out the scale (54).

2. An apparatus according to claim 1, characterised in that the scale (54) is an incremental scale.

3. An apparatus according to claim 1, characterised in that the scale (54) is an absolute scale.

4. An apparatus according to claim 1, characterised in that the reading device (56) is adapted to read out the scale (54) optically, magnetically, capacitively and/or inductively.

5. An apparatus according to claim 1, characterised in that the scale (54) is arranged on a circumferential surface of the respective upper and/or lower punch (18, 20), being incorporated into the circumferential surface.

6. An apparatus according to claim 1, characterised in that the reading device (56) is arranged on an accommodation element (22, 24) of the respective upper and/or lower punch (18, 20).

7. An apparatus according to claim 1, characterised in that a sending device (58), also synchronously rotating with the rotor (12), and a receiving device (60) arranged stationarily outside of the rotor (12) are provided, wherein position data measured by the reading device (56) can be sent to the receiving device (60) by means of the sending device (58) via a wireless transmission.

8. An apparatus according to claim 1, characterised in that it has an angular sensor, by which the circumferential positions of at least one upper and/or lower punch (18, 20) occupied during one rotation of the rotor can be measured, wherein the vertical positions of the at least one upper and/or lower punch (18, 20) measured by the reading device (56) can be assigned to the circumferential positions of the respective upper and/or lower punch (18, 20) measured by the angular sensor by means of an analysing device.

9. A rotary tablet press with a rotatably driven rotor and upper and lower punches, pairwisely associated to the rotor and rotating synchronously with the rotor, which perform a vertical movement in certain regions along the circumference of their rotational movement during a rotation of the rotor, further comprising:

an apparatus for the measurement of the vertical position of upper and lower punches, pairwisely associated to a rotatably driven rotor of a rotary tablet press and rotating synchronously with the rotor, which perform a vertical movement in certain regions along the circumference of their rotational movement during a rotation of the rotor, characterised by at least one scale (54) arranged on at least one of the upper and/or lower punches (18, 20), running in parallel to the vertical movement direction of the respective upper and/or lower punch (18, 20), and at least one reading device (56) associated to the scale (54), also rotating synchronously with the rotor (12), by means of which a vertical position of the respective upper and/or lower punch (18, 20) can be measured by reading out the scale (54).

* * * * *